US011155970B2

(12) United States Patent
Logan et al.

(10) Patent No.: US 11,155,970 B2
(45) Date of Patent: Oct. 26, 2021

(54) SUSPENSION MOUNTED HEATING SYSTEM

(71) Applicant: nVent Services GmbH, Schaffhausen (CH)

(72) Inventors: Stephen Logan, Cameron Park, CA (US); Sudhir Thorat, Dublin, CA (US)

(73) Assignee: nVent Services GmbH, Schaffhausen (CH)

( * ) Notice: Subject to any disclaimer, the term of this patent is extended or adjusted under 35 U.S.C. 154(b) by 270 days.

(21) Appl. No.: 16/162,291

(22) Filed: Oct. 16, 2018

(65) Prior Publication Data

US 2019/0112766 A1 Apr. 18, 2019

Related U.S. Application Data

(60) Provisional application No. 62/572,923, filed on Oct. 16, 2017.

(51) Int. Cl.
| | |
|---|---|
| *E01C 11/26* | (2006.01) |
| *H05B 3/36* | (2006.01) |
| *H05B 3/28* | (2006.01) |
| *H05B 3/06* | (2006.01) |
| *F24D 13/02* | (2006.01) |
| *E04F 11/02* | (2006.01) |

(52) U.S. Cl.
CPC .......... *E01C 11/265* (2013.01); *F24D 13/022* (2013.01); *H05B 3/06* (2013.01); *H05B 3/28* (2013.01); *H05B 3/36* (2013.01); *E04F 2011/0203* (2013.01); *H05B 2203/014* (2013.01); *H05B 2203/026* (2013.01); *H05B 2203/033* (2013.01); *H05B 2214/02* (2013.01)

(58) Field of Classification Search
None
See application file for complete search history.

(56) References Cited

U.S. PATENT DOCUMENTS

| | | | |
|---|---|---|---|
| 2,138,217 A | 11/1938 | Sutter | |
| 3,881,235 A | 5/1975 | Svenstam | |
| 4,733,057 A * | 3/1988 | Stanzel | ................... F24D 13/02 |
| | | | 219/548 |
| 5,380,988 A | 1/1995 | Dyer | |
| 5,550,350 A | 8/1996 | Barnes | |

(Continued)

FOREIGN PATENT DOCUMENTS

| | | |
|---|---|---|
| CN | 102188148 A | 9/2011 |
| CN | 202347755 U | 7/2012 |

(Continued)

OTHER PUBLICATIONS

JP 2009250016 (A), Oct. 2009, Katajima, partial translation. (Year: 2009).*

(Continued)

*Primary Examiner* — Joseph M. Pelham
(74) *Attorney, Agent, or Firm* — Quarles & Brady LLP

(57) ABSTRACT

A suspension mounted heating system is designed to allow easy installation of electric heating cable that is positioned against the bottom surface of a suspended stair or walkway so that heat generated by the cable is efficiently transferred up into the stair or walkway material to raise its temperature enough to prevent the accumulation of snow and ice on the material's top surface.

17 Claims, 17 Drawing Sheets

(56) References Cited

U.S. PATENT DOCUMENTS

| | | | |
|---|---|---|---|
| 6,438,909 B2 | 8/2002 | Birch et al. | |
| 6,943,320 B1 | 9/2005 | Bavett | |
| 7,013,609 B2* | 3/2006 | Hydock | F24D 3/142 52/220.1 |
| 8,076,619 B1 | 12/2011 | Wingale | |
| 2001/0026681 A1* | 10/2001 | Schmitt | H05B 3/56 392/435 |
| 2002/0189177 A1 | 12/2002 | Eve et al. | |
| 2012/0067868 A1* | 3/2012 | Casey | E04D 13/103 219/546 |
| 2015/0335202 A1* | 11/2015 | Wisner | H05B 3/686 392/346 |
| 2017/0067653 A1* | 3/2017 | Forsbom | F24D 13/02 |
| 2017/0191228 A1* | 7/2017 | Dong | H05B 1/0252 |
| 2019/0112767 A1* | 4/2019 | Logan | H05B 3/46 |

FOREIGN PATENT DOCUMENTS

| | | |
|---|---|---|
| CN | 204217144 U | 3/2015 |
| CN | 106275293 A | 1/2017 |
| DE | 102012000764 A1 | 7/2013 |
| JP | H06220983 A | 8/1994 |
| JP | H06240853 A | 8/1994 |
| JP | 2009250016 A | 10/2009 |
| KR | 100471734 B1 | 2/2005 |
| KR | 20130020967 A | 3/2013 |
| KR | 20140110310 A | 9/2014 |
| KR | 20150004141 A | 1/2015 |

OTHER PUBLICATIONS

Floormat.com; Snow Melting Mats; Copyright 2000-2019 Floormat.com a Progressive Company; retrieved from the Internet; 2 pages.
Heat Trak LLC; HeatTrak Snow Melting Mats; Copyright 2014; retrieved from the internet; 6 pages.
CozyWinters; Ice and Snow Melting Heated Mats and Stair Treads; Copyright 2002-2019 Delutti, Inc.; retrieved from the internet; 2 pages.
The Vermont Country Store; Ice Breaker Mats; Copyright 2018; retrieved from the internet; 4 pages.
Meiste; Heated Stair Mats; Copyright Meiste Industrial Shenzhen Limited; retrieved from the internet Jan. 3, 2019; 1 page.

* cited by examiner

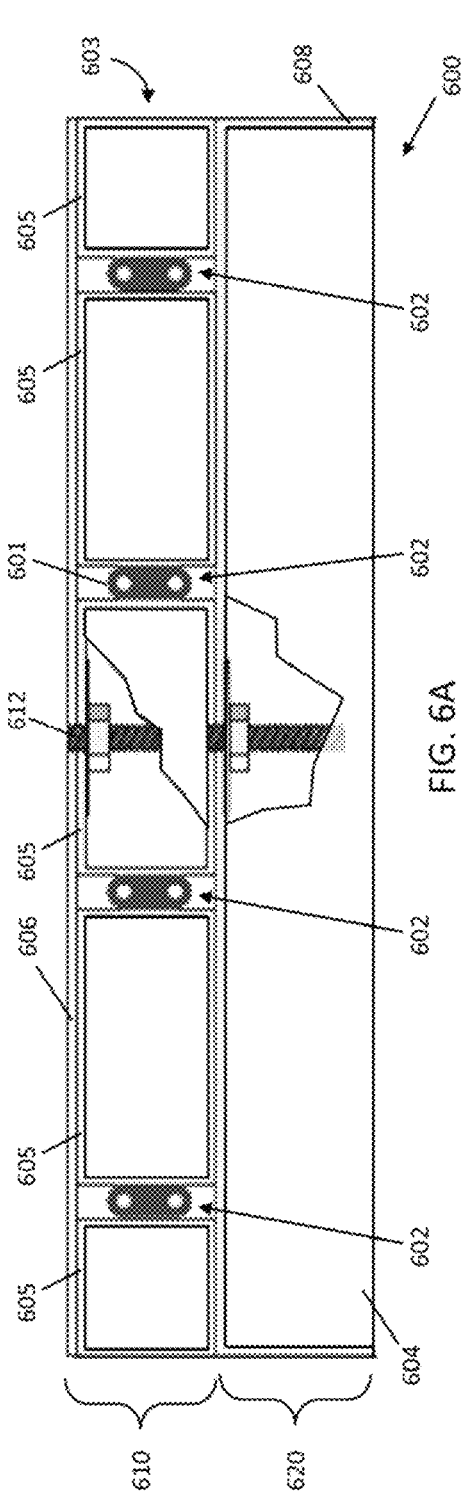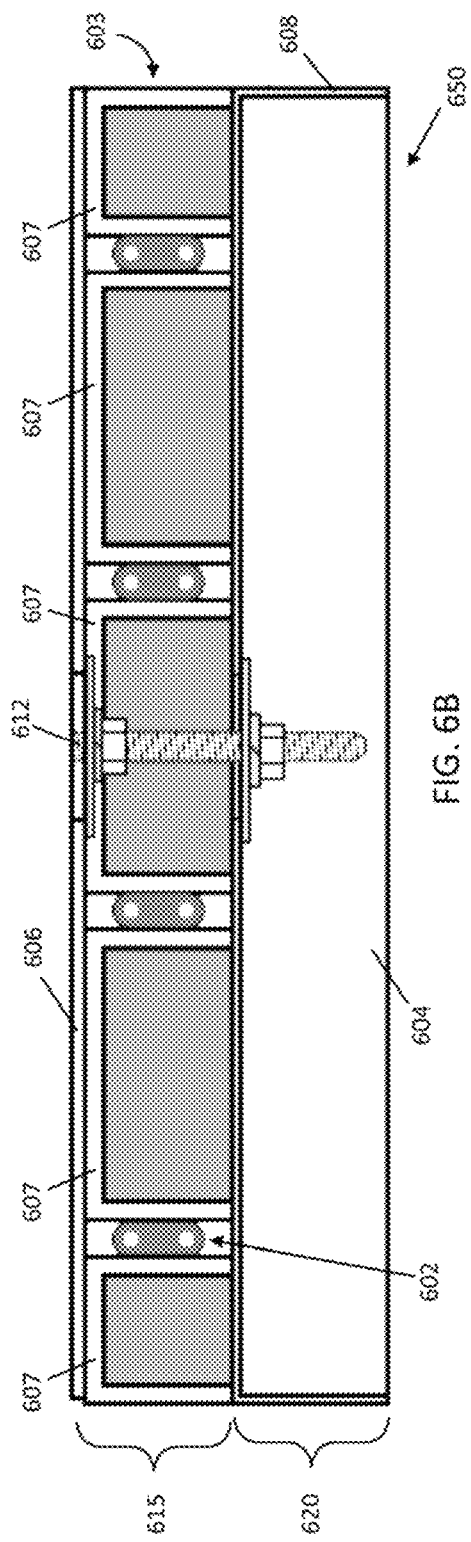
FIG. 6A
FIG. 6B

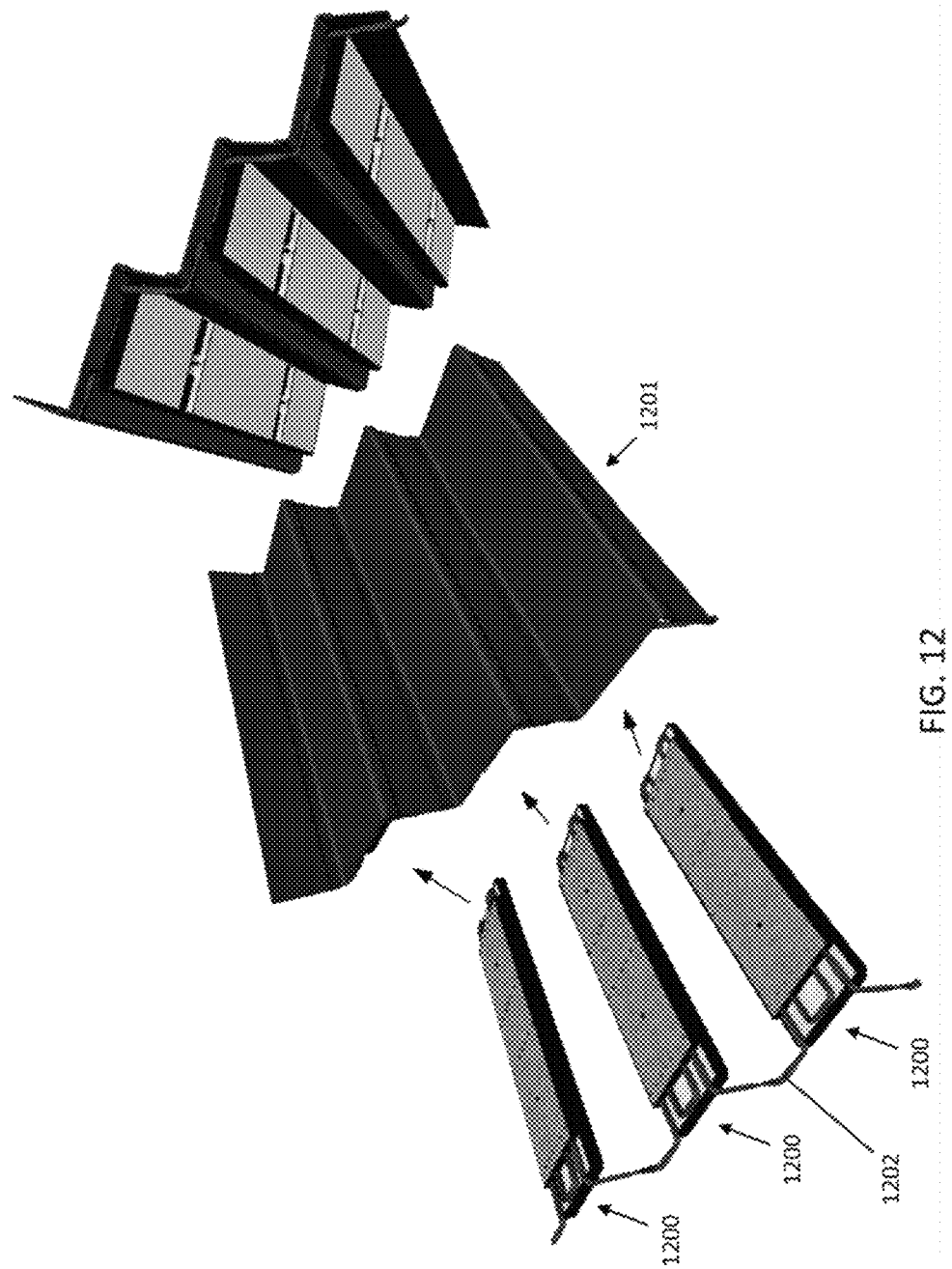

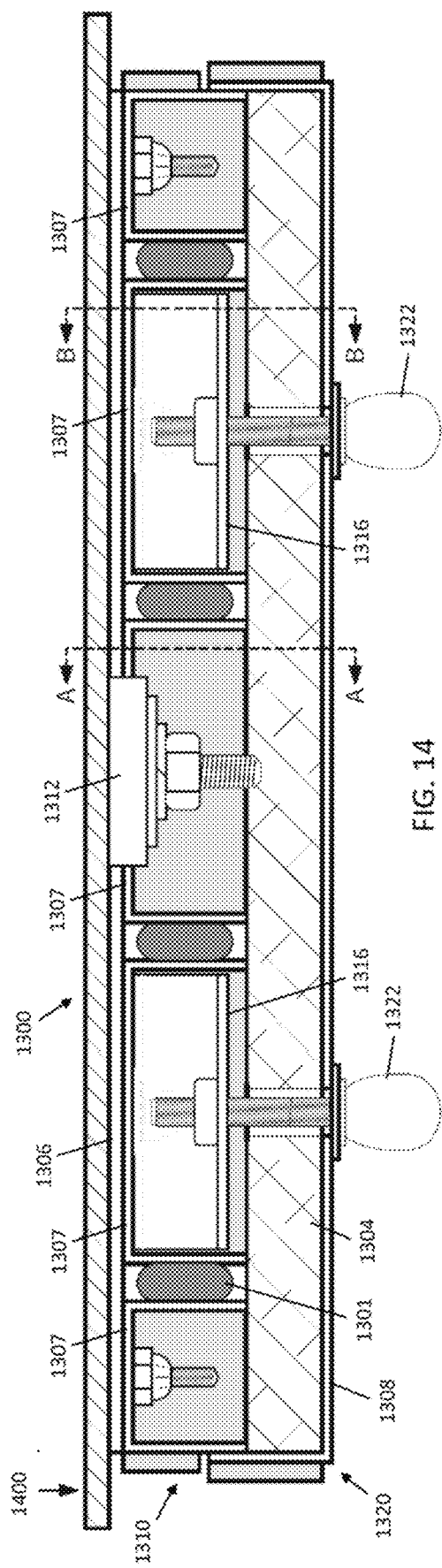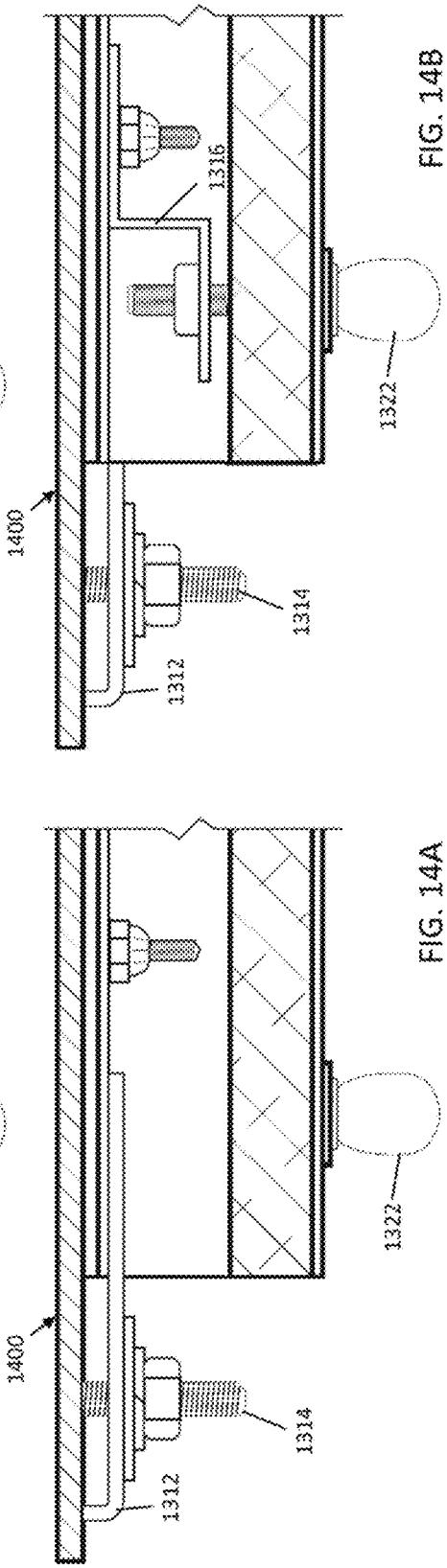
FIG. 14
FIG. 14A
FIG. 14B

SUSPENSION MOUNTED HEATING SYSTEM

CROSS-REFERENCE TO RELATED APPLICATIONS

This application is a non-provisional and claims the benefit of U.S. Prov. Pat. App. Ser. No. 62/572,923, filed under the same title on Oct. 16, 2017, and incorporated herein in its entirety by reference.

BACKGROUND

Snow and sleet on walkways make for hazardous, slippery conditions for pedestrians. Some suspended access ways, such as metal stairs and walkways, must remain snow and ice free on their top surfaces. Typically, ameliorative measures comprise shoveling deep snow from the path and scattering sand or salt over the remaining icy layer to promote melting. However, the sand and salt still require cooperation from the weather; although they promote melting at low temperatures, when the air temperature is too cold, the ice won't melt readily so the sand and salt are not effective. Other methods for mitigating the risk from ice coverage may include the placement of a heating mat on top surface of stair or walkway material, though this can be labor intensive and requires human involvement to monitor the conditions and lay the mats. Electrically heated de-icing devices that are simply laid over existing walkways provide a solution that has more widespread commercial appeal as a method of clearing ice from entranceways. One example of such a device is embodied in a flexible mat composed of two sheets with a heating element in between. However, these particular devices are unsatisfactory when there is heavy snowfall. In such circumstances, people find it necessary to shovel off the deep snow, relying on the heating element merely to prevent an icy layer from forming. The flexible mats are susceptible to damage from the snow shoveling implements; the mat itself can be pierced, thus damaging the electrical heating element inside. Since the mats are made of flexible material, the heating elements within are subject to wear from the flexing and bending resulting from the weight of persons walking on the mats. Furthermore, a rubber mat is not a good thermal conductor, so means for conducting the heat to the surface of the mat are required. Some de-icing mats have been made more protective of the electrical heating elements inside by substituting for the flexible sheets, interleaved link elements, which have hollow metal tubes containing electrical heating elements sealed within. This serves to protect the electrical wires from sharp instruments, but it makes shoveling the snow extremely difficult because it presents an uneven surface for the snow shovel. Furthermore, a mat composed of hollow tubes does not provide very safe footing.

Compressible "ice breaker" mats may also be used on a top surface of stair or walkway material. This approach is does not apply heat, but relies on pedestrian weight to deform the mat surface to crack accumulated ice, though this method is not very efficient and requires sufficient downward force to break the ice, and shoveling of the broken ice and snow buildup is still necessary. In some cases, heating cable may be embedded in poured concrete stairs or walkways. However, if the electrical heating element fails, repair requires breaking through the existing walkway to reach the electrical parts. Further, these devices are only useful where permanently-installed devices are feasible. They do not offer a means to prevent ice build-up on existing walkways and steps, and installation of these systems is costly.

SUMMARY

The invention overcomes the above and other drawbacks to address the need for a better method of heating walkways or stairways to prevent ice and snow buildup that can be easily installed. A suspension-mounted heating (SMH) system configured to be suspended from a walkway or stairway and to heat the walking surface, in accordance with one aspect of the invention, includes a plurality of SMH panels each able to be fastened to the stairway or walkway on an underside of one of the one or more walking surfaces, and each including: a thermally conductive plate having a top surface that abuts the underside of the walking surface when the SMH panel is fastened to the stairway or walkway; a plurality of thermally conductive supportive structures attached to the plate to form a cable support tray, the plurality of supportive structures spaced apart from each other to form a plurality of slots; an insulation layer; and, a bottom support tray retaining the insulation layer and, when the SMH panel is fastened to the stairway or walkway, disposed below the cable support tray, covering the plurality of slots and cooperating with the insulation layer to minimize heat loss through a bottom surface of the SMH panel. The SMH system further includes a self-regulating heating cable electrically connecting to a power supply and disposed within a first SMH panel and a second SMH panel of the plurality of SMH panels, the plurality of slots of the first SMH panel defining a path of the heating cable that positions the heating cable relative to at least one of the one or more walking surfaces in order to efficiently transfer heat from the heating cable to the underside of the at least one walking surface.

The plurality of slots of each of the plurality of SMH panels can have a slot width selected to allow the heating cable to be inserted by a system installer into a corresponding slot of the plurality of slots, and to retain the heating cable within the corresponding slot. The slot width can further be selected to maximize contact of the heating cable with the plurality of support structures. The cable support tray, the bottom support tray, and the insulation layer each can include a first aperture and a second aperture aligned longitudinally with the first aperture, and the SMH system further can include a first fastener, a second fastener, a first locking device, a second locking device, a third locking device, and a fourth locking device, the first SMH panel being fastened to the stairway or walkway when: the first fastener is attached to the stairway or walkway, extending downward from the underside of a first walking surface of the one or more walking surfaces and through the corresponding first apertures of the cable support tray, the bottom support tray, and the insulation layer; the second fastener is attached to the stairway or walkway, extending downward from the underside of the first walking surface and through the corresponding second apertures of the cable support tray, the bottom support tray, and the insulation layer; the first locking device is attached to the first fastener and the second locking device is attached to the second fastener to secure the cable support tray in place with the top surface of the plate abutting the underside of the first walking surface; the heating cable is disposed in the plurality of slots of the first SMH panel; and, the third locking device is attached to the first fastener and the fourth locking device is attached to the second fastener to secure the bottom support tray in place against the cable support tray.

The cable support tray and the bottom support tray of the first SMH panel can have an equal width, and longitudinal edges of the cable support tray are aligned with longitudinal edges of the bottom support tray, providing a uniform assembly, when the first SMH panel is fastened to the stairway or walkway. The system can further include a controller in electrical communication with one or both of the power supply and the heating cable, the controller including a processor and memory storing machine-readable program instructions that, when executed by the processor, cause the controller to receive control signals and energize and de-energize the heating cable in response to the control signals. The system can further include one or more sensors in electronic communication with the controller and configured to detect the presence of snow or ice on the one or more walking surfaces and send one or more of the control signals to the controller.

In another aspect, the invention provides a system configured to be suspended from a walkway, the system including a top layer and a bottom layer. The top layer includes a top plate in contact with a surface on an underside of the walkway, and a cable support tray configured to receive a heating cable in an optimal configuration for transferring heat generated by the heating cable through the top plate to the surface. The bottom layer aligns with the top layer and includes a support tray and an insulation layer disposed within the support tray. The cable support tray can include a plurality of supportive structures attached to the top plate and spaced apart from each other to form a plurality of slots for retaining the heating cable, the plurality of slots defining a path for positioning the heating cable relative to the surface in the optimal configuration. The plurality of supportive structures can be thermally conductive, and further can be spaced at a slot width selected to maximize contact between the heating cable and the plurality of supportive structures when the heating cable is retained in the plurality of slots. The plurality of supportive structures can be rectangular tubes and/or u-shaped channels.

The insulation layer can include a closed cell foam insulation, the bottom layer abutting the top layer to cover the plurality of slots and minimize loss, from an underside of the top layer, of heat produced by the heating cable. The system can further include a plurality of fasteners attaching to the walkway and extending through the top plate and the support tray, and a plurality of locking devices each attaching to a corresponding fastener of the plurality of fasteners to suspend the system from the walkway. The top layer can further include a first mounting bracket and a second mounting bracket each attached to the top plate and extending beyond a perimeter of the top plate, the first and second mounting brackets each receiving a corresponding fastener of a plurality of fasteners extending through the walkway to suspend the system from the walkway. The first mounting bracket can be movably attached to the top plate such that the first mounting bracket can be repositioned to align with an attachment point on the walkway.

In yet another aspect, the invention provides a method of installing a SMH system for melting snow and ice on a walking surface of a walkway or stairway, the method including the steps of: installing a plurality of fasteners on the walkway or stairway such that each of the plurality of fasteners extends downward from a corresponding surface of one or more surfaces on an underside of the walkway or stairway; installing a top layer of a first SMH panel to a first surface of the one or more surfaces, the top layer comprising a plurality of slots; positioning a heating cable within the top layer of the first SMH panel in a pattern defined by the plurality of slots, the pattern optimizing transmission of heat generated by the heating cable through the top layer and the first surface to the walking surface; aligning a thermally insulating bottom layer of the first SMH panel with the top layer of the first SMH panel; and fastening, with one or more of the plurality of fasteners, the bottom layer of the first SMH panel to the top layer of the first SMH panel such that the bottom layer minimizes loss, from the first SMH panel, of heat generated by the heating cable. Installing the top layer of the first SMH panel can include sliding the top layer over a first fastener and a second fastener of the plurality of fasteners, and attaching a first locking device to the first fastener and a second locking device to the second fastener to secure the top layer against the first surface. The method can further include: installing a top layer of a second SMH panel to the first surface or a second surface of the one or more surfaces, the top layer comprising a plurality of slots; positioning the heating cable within the top layer of the second SMH panel in the pattern defined by the plurality of slots of the top layer of the second SMH panel; aligning a thermally insulating bottom layer of the second SMH panel with the top layer of the second SMH panel; and fastening, with one or more of the plurality of fasteners, the bottom layer of the second SMH panel to the top layer of the second SMH panel such that the bottom layer minimizes loss, from the second SMH panel, of heat generated by the heating cable.

DESCRIPTION OF THE DRAWINGS

FIG. 6A illustrates an example embodiment of a side view of the suspension mounted heating system fully installed.

FIG. 6B illustrates an alternate embodiment of a side view of the suspension mounted heating system fully installed.

FIG. 12 is an illustration of the system deployed on a stairway.

FIG. 14 is a front view of the panel of FIG. 13A, shown installed on a step.

FIG. 14A is a cross-sectional partial side view of the panel of FIG. 13A installed on a step, taken along line A-A of FIG. 14.

FIG. 14B is a cross-sectional partial side view of the panel of FIG. 13A installed on a step, taken along line B-B of FIG. 14.

DETAILED DESCRIPTION

Figure 1:
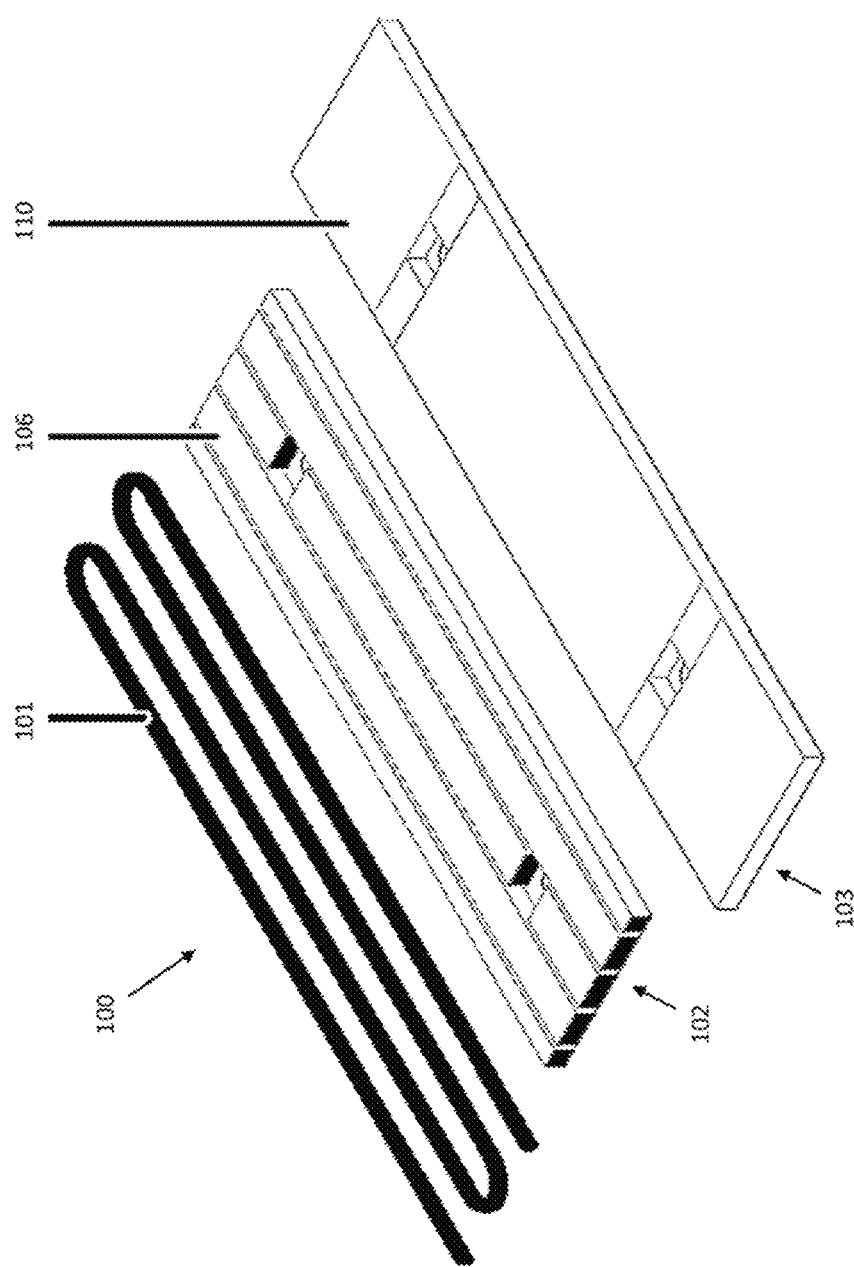
FIG. 1 illustrates a heating cable, a heating cable support tray, and an insulation tray.

Before any embodiments are described in detail, it is to be understood that the invention is not limited in its application to the details of construction and the arrangement of components set forth in the following description or illustrated in the following drawings, which is limited only by the claims that follow the present disclosure. The invention is capable of other embodiments, and of being practiced, or of being carried out, in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following description is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the invention.

Additionally, while the following discussion may describe features associated with specific devices, it is understood that additional devices and or features can be used with the described systems and methods, and that the discussed devices and features are used to provide examples of possible embodiments, without being limited.

Referring to FIG. 1, a suspension mounted heating (SMH) system 100 for heating walking surfaces and other surfaces of a stairway or walkway includes at least one electric resistance heating cable 101 and one or more SMH panels each having a top layer 102 and a bottom layer 103. The SMH system 100 provides a predefined, optimized system that can be quickly and securely installed on the bottom surface of stairways or walkways. The top layer 102 may be or include a heating cable support tray that receives and retains at least one heating cable 101. In some embodiments, the heating cable support tray is an assembly of a flat plate 104, made of aluminum or similar thermally conductive material, to which a set of supportive structures 106, such as extruded tubes or U-shaped channels, are attached. Alternatively, the supportive structures 106 may be integral with the plate 104.

The supportive structures 106 may be formed from aluminum or similar material, and may be spaced apart laterally (e.g., perpendicular to the direction of extrusion) from each other. The spaced supportive structures 106 define pre-designed slots 105 between the structures 106 that provide a snug fit for the heating cable 101. The structures 106 are arranged to provide a specific slot width within which the heating cables 101 are placed. The width provides an optimized balance between ease of cable installation and maximum cable contact against the tube surfaces. The structures 106 may be made from aluminum of similar material with beneficial heat conduction properties. The structures 106 are designed to efficiently transfer heat from the heating cable 101 to the bottom surface of the walkway or stairway to melt snow or ice that may accumulate.

A bottom layer 103 of the SMH panel may include an assembly of structural parts, such as a support tray, containing or supporting an insulation layer 110 and designed to automatically align to heating cable support tray of the top layer 102 when installed. The bottom layer 103 may be positioned under the top layer 102 and heating cable 101 to minimize the heat loss from the bottom and better promote heat transfer to the stairway or walkway surface above the SMH system 100. The support tray of the bottom layer 103 is designed to closely align with the cable support tray of the top layer 102 to more effectively prevent heat loss out the bottom. When fully assembled, the SMH system 100 ensures that heat is efficiently and uniformly transferred from the heating cable 101 to the suspended metal elements of the top layer 102.

Typically the SMH system 100 may be placed against a bottom surface of stair or walkway. Using the installation and mounting method described herein, the SMH 100 assembly can be suspended from the underside of a walkway or stairway. By being on the underside of the walkway rather than on a top surface, wear or damage to the heating assembly due to continued physical contact with pedestrian traffic or from dragging or rolling of equipment across top surface can be eliminated.

The configuration of the system 100 when fully installed enables easy inspection, adjustment, or replacement of heating cable 101 due to the accessibility of the system 100 on the underside of the walkway or assembly. The position on the underside of the walkway means the SMH system 100 does not alter or cover aesthetic designs or engineered properties of stair or walkway top surfaces. This is a particular advantage over salt or chemical solutions which introduce environmental concerns. The system 100 is out of sight and unobtrusive even when not in use, and therefore the SMH system 100 does not have to be removed and stored after every winter season.

The SMH system 100 provides a long-term snow melting solution that mechanically protects the heating cable 101 from mechanical stresses that may otherwise be introduced through use on a walkway. The insulation layer 110, in addition to providing more efficient heat transfer also conceals the heating cable 101 and provides an aesthetically pleasing solution. The configuration of the heating cable 101 within the cable support tray of the top layer 102 and addition of the insulation layer 110 on the bottom surface provides a highly performing and reliable solution for heavy snow load areas.

The system 100 is designed for a specific installation method that optimizes the properties of the system 100 and enables modularity for connecting multiple SMH system 100 components together to cover different sized surfaces. Typically the installation surface should be cleared of sharp protrusions such as rough seams or weld splatter and be free of rust and corrosion. There may need to be sufficient room and space to attach the SMH system 100 to the underside of a stair. As such, any obstructions such as wiring, conduit, support brackets, or other things that may limit the physical contact of the SMH to a stair or walkway should be removed. The mounting surface must be clean of debris and moisture.

In one embodiment, the SMH system 100 consists of a number of layers that are connected together, including a high wattage electric heating cable 101, supportive structures 106 (e.g., tubes or channels) positioned to provide slots defining a path for the cable 101, a top aluminum plate 104 in contact with the heated surface, and a support tray containing a layer of insulation 110. A cable support tray 102 comprised of aluminum channels 106 attached to the top aluminum plate 104 forms a top layer 102 of the SMH system 100. The cable support tray 102 further includes a series of slots formed by the channels or tubes 106 and configured in an appropriate size to receive a heating cable 101 and hold it in a fixed position. In some embodiments, a self-regulating heating cable 101 may be utilized. The heating cable 101 is held in a specific pattern by the formed slots on the cable support tray 102, the pattern being designed to optimize the position of the cable relative to the walkway in order to efficiently transfer heat from the cable to the bottom surface of the walkway.

The top layer 102 is fastened to a bottom layer 103, such as a support tray containing an insulation layer, which forms an enclosure that contains a heating cable 101. That is, the bottom layer 103 (e.g., a bottom support tray) covers the slots, enclosing the heating cable 101. In some embodiments, the bottom layer 103 may contain an insulation layer 110, such as layer (with a thickness, for example, of about 1 inch) of closed cell foam insulation within a structural tray that minimizes the heat loss from the bottom surface of the SMH system 100, though in other embodiments the insulation may be of a different thickness. Furthermore, the insulation layer 110 is not limited to closed cell foam insulation, and in other embodiments may include materials with similar insulating properties. In some cases, threaded attachment fasteners such as screws, or similar fasteners may be used to attach the top layer of the SMH system 100 to the bottom layer. Aluminum tape or other insulating adhesive closure material may be used to seal certain holes or seams in the system 100 to more efficiently seal the heat.

Figure 2:
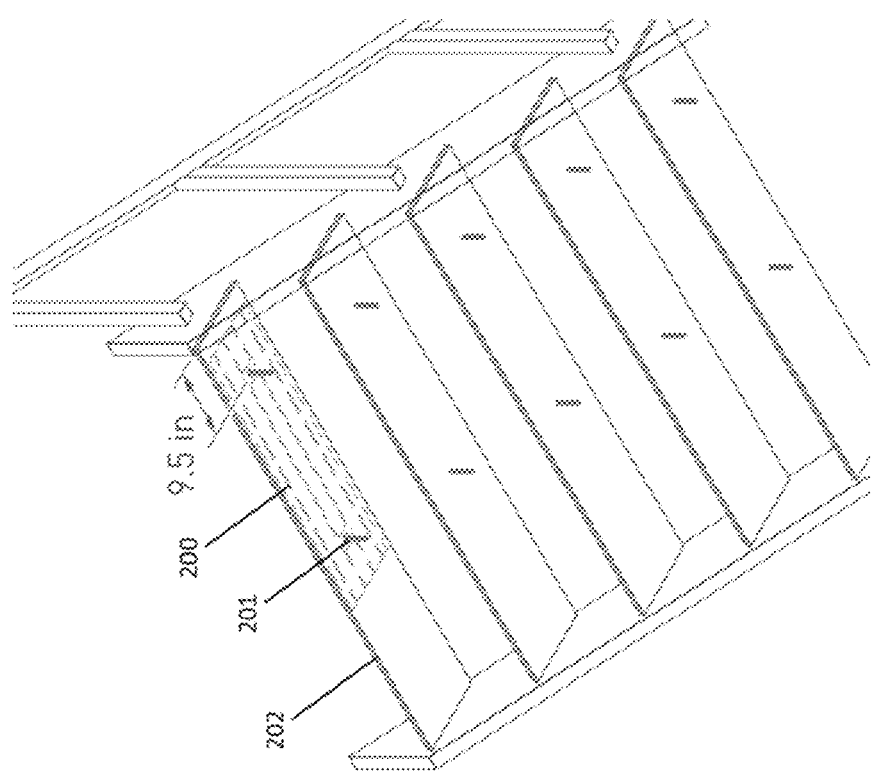
FIG. 2 illustrates a step in the method of installation.

FIG. 2 shows an example method of attaching a SMH system 200 to a surface 202 which includes installing a number of threaded fasteners 201 on the underside of a surface 202 where suspension is needed. FIG. 2 shows an example of fasteners 201 installed on the underside 202 of a stairs in a stairway. The fasteners 201 should be installed at specific distances from the edges of the stairway or walkway to enable to SMH system 200 to be appropriately positioned for optimal heating. In the case of stairs, the fasteners 201 should be installed centered on the stair tread depth unless specified otherwise.

Figure 3:
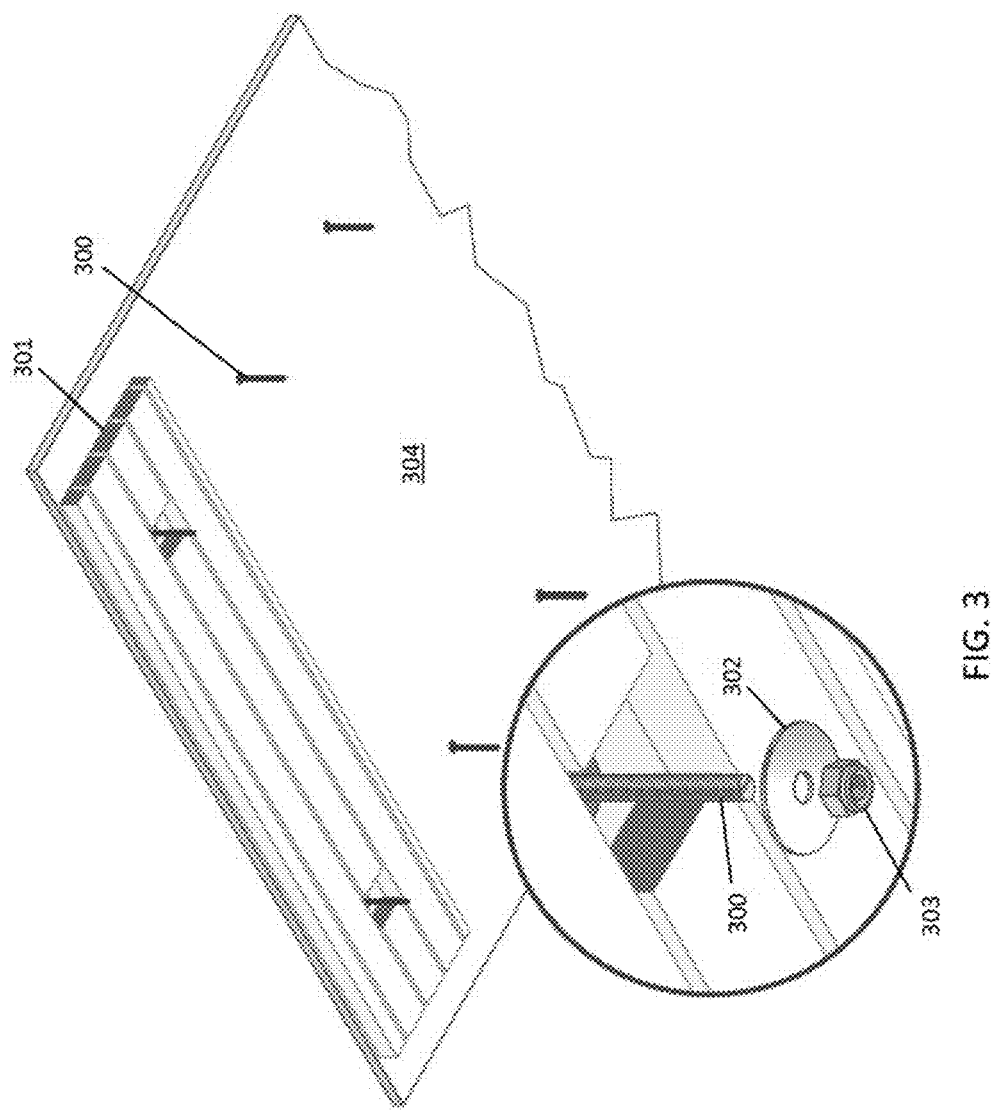
FIG. 3 illustrates the method of one component of the system.
Figure 4:
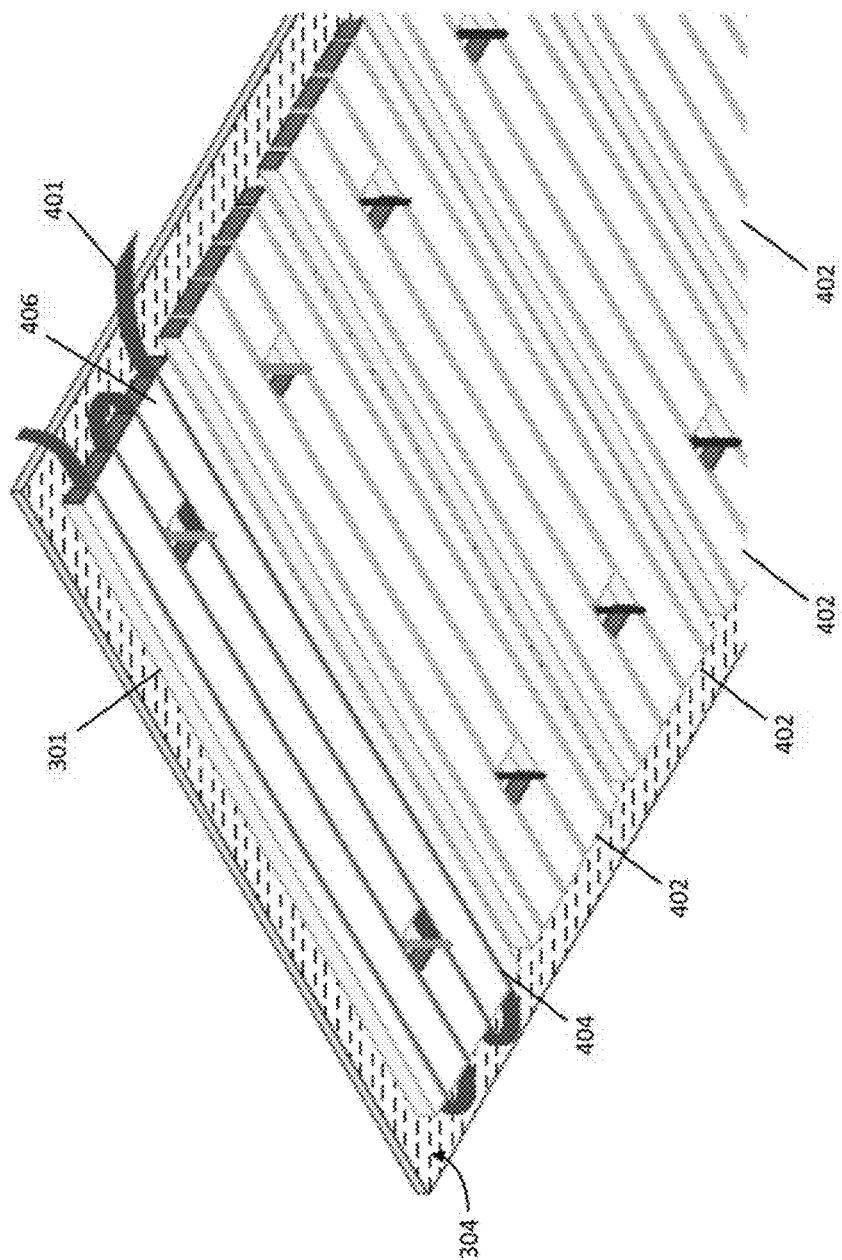
FIG. 4 illustrates a method of installing a heating cable in the system.

As shown in FIG. 3, once fasteners 300 (i.e., fasteners 201 of FIG. 2) are attached to the stairway or walkway surface, the SMH system (e.g., SMH system 100 of FIG. 1) can be attached. FIG. 3 illustrates this method applied to an example embodiment of the SMH (e.g., SMH system 100 of FIG. 1). The SMH top layer, comprising a cable support tray 301, is aligned with and slid over the fasteners 300 into contact with an underside surface 304 of the walking surface to be heated. In this example embodiment, a washer 302 is slid over each fastener 300, and a locking device 303 is threaded onto the fastener 300 attached to the mounting surface. This locking device 303 may be a nylon insert locking nut or other similar fastener that is tightened snugly to secure the support tray 301 in place. Referring to FIG. 4, additional support trays 402 may be installed in a similar fashion as needed across the area of the surface 304. Once the cable support tray(s) 301, 402 of the SMH system 100 is/are installed on the surface 304, a heating cable 401 (e.g., heating cable 101 of FIG. 1) may be installed within the cable support tray 301 of the first top layer. The cable support tray 301 is configured to receive the heating cable 401 within slots 404 formed between the supportive structures 406 (e.g., extruded tubes or channels). The heating cable 401 is disposed within the slots 404 of the support tray 301 in a configuration that optimizes the heat transfer from the cable 401 through the top layer of the SMH system to the surface 304.

Figure 5:
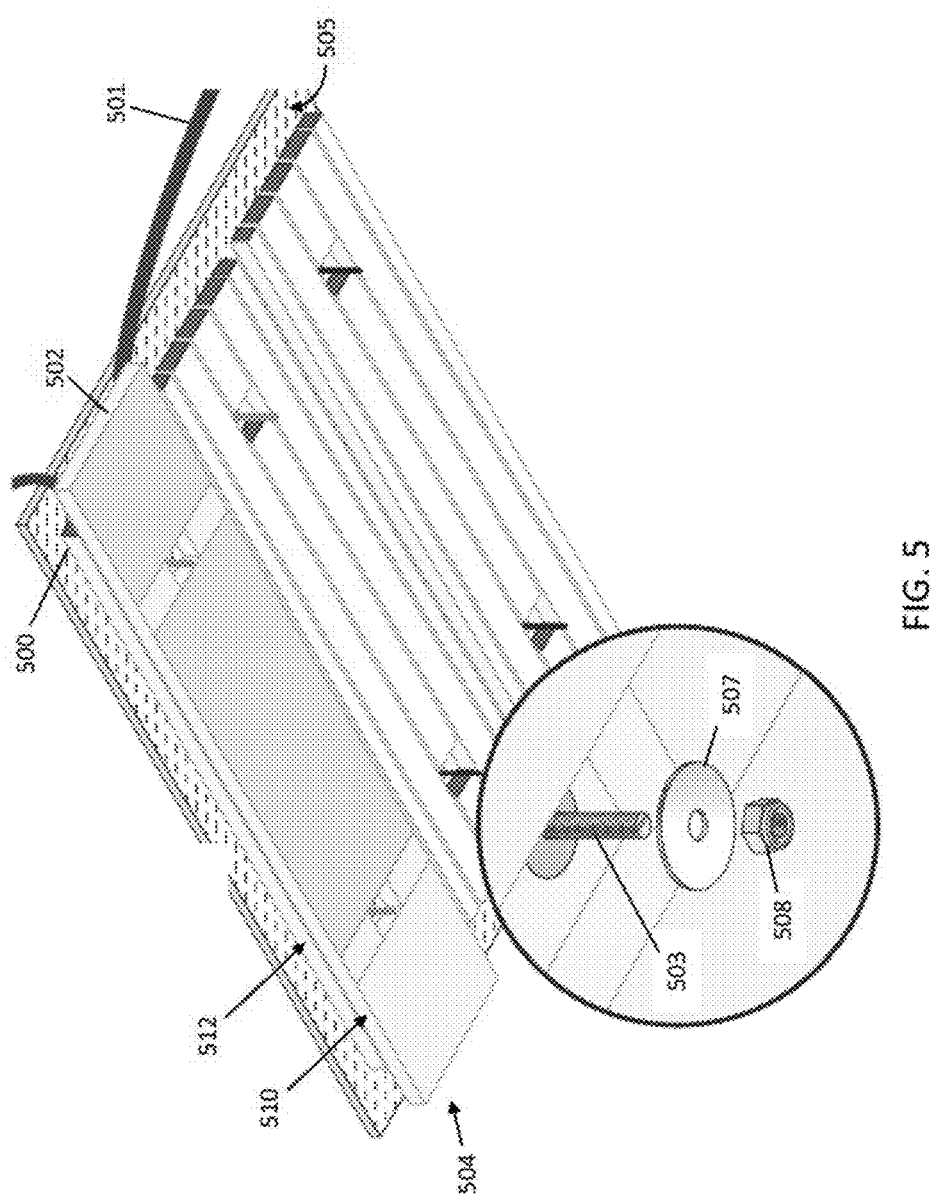
FIG. 5 illustrates of one section of the suspension mounted heating system fully installed.

As depicted in FIG. 5, in some embodiments, once a top layer 500 of the SMH system 504 has been installed on the underside surface 505 and a heating cable 501 positioned within slots of the top layer 500, a bottom layer 502 of the SMH system may be attached. The bottom layer 502 may be aligned with and slid over the threaded fasteners 503. The bottom layer 502 can be configured to have edges 510 (e.g., both lateral edges as shown) aligned with corresponding edges 512 of the top layer 500 to form a uniform assembly. A magnified inset shows an example embodiment of fasteners used to secure the layers together. Additional fasteners may be used to attach the bottom layer 502 to the top layer 500. For example, a washer 507 of sufficient diameter and a threaded nylon insert locking nut 508 may be tightened snugly so that the bottom section 502 is in contact with the top section 500. FIG. 5 illustrates a section of a SMH system 504 where a bottom layer 502 has been installed over a top layer 500.

FIG. 6A shows a side view of an example embodiment of a SMH system 600 with a top layer 610 and bottom layer 620 attached together as if fully installed on the underside of a walkway. Within the top layer 610, a heating cable 601 is installed within slots 602 of a cable support tray 603. In the depicted example, the cable support tray 603 is formed by rectangular tubes 605 attached to a flat thermally conductive (e.g., aluminum) plate 606 and spaced apart to form the slots 602. In other embodiments, a supportive structure other than a rectangular tube 605 may be used to form the slots for retaining the heating cable 601. For example, FIG. 6B depicts another embodiment of a SMH system 650 wherein the cable support tray 653 is formed from a series of U-shaped channels 607 attached to the plate 606 with a suitable spacing to form the desired slots 602. As shown in both FIGS. 6A and 6B, the bottom layer 620 of the SMH system 600, 650 can include a bottom support tray 608 containing an insulation layer 604, such as closed-cell foam insulation or another thermal insulation, as described further below. In some embodiments, a fastener 612 can extend through both the top layer 610, 615 and the bottom layer 620 to affix the SMH system 600, 650 to the stair/walkway as described herein.

Figure 7:
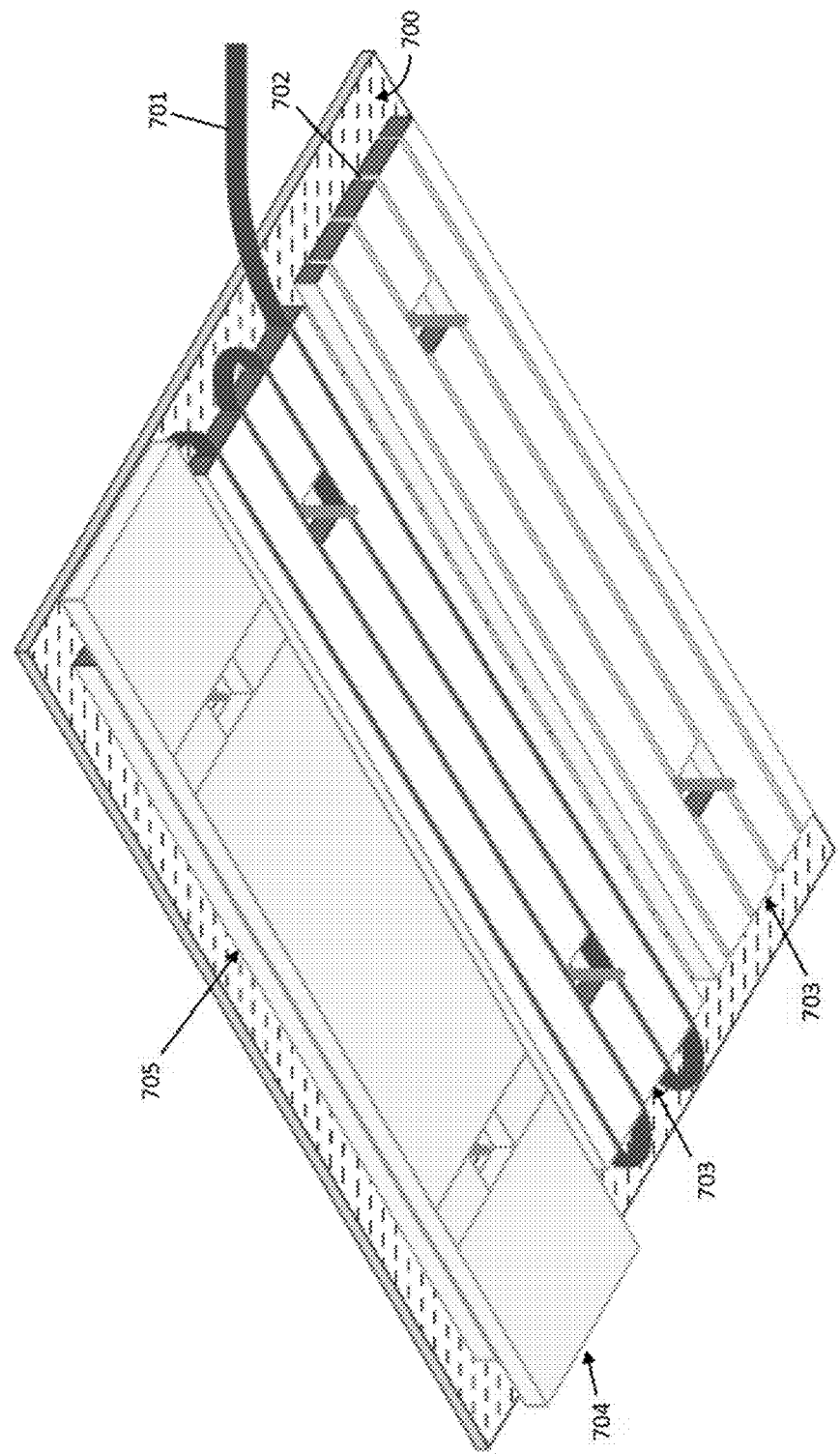
FIG. 7 illustrates one step in a method of installing the system on a stairway.

As depicted in FIG. 7, for flat surfaces 700, an installer can continue (i.e. from FIG. 5) installing the heating cable 701 in the slots 702 of adjoining SMH top layers 703, following the procedures of attaching a top layer 703, positioning the cable 701, and attaching a bottom layer 704. In this system, multiple runs of heating cable 701 may be connected together to form a continuous cable that may span a number of SMH cable support tray assemblies 705. In some embodiments, it may be necessary to install splices to connect heating cables 701 together. An example method of installing a splice in this system would include marking the location of splices on the heating cable installation drawing for future reference. When the entire length of heating cable 701 has been placed within the cable support trays of the installed first layers 703, it may be necessary to terminate the heating cable with a power connection with an approved junction box and heat shrink end seal kit.

Figure 8:
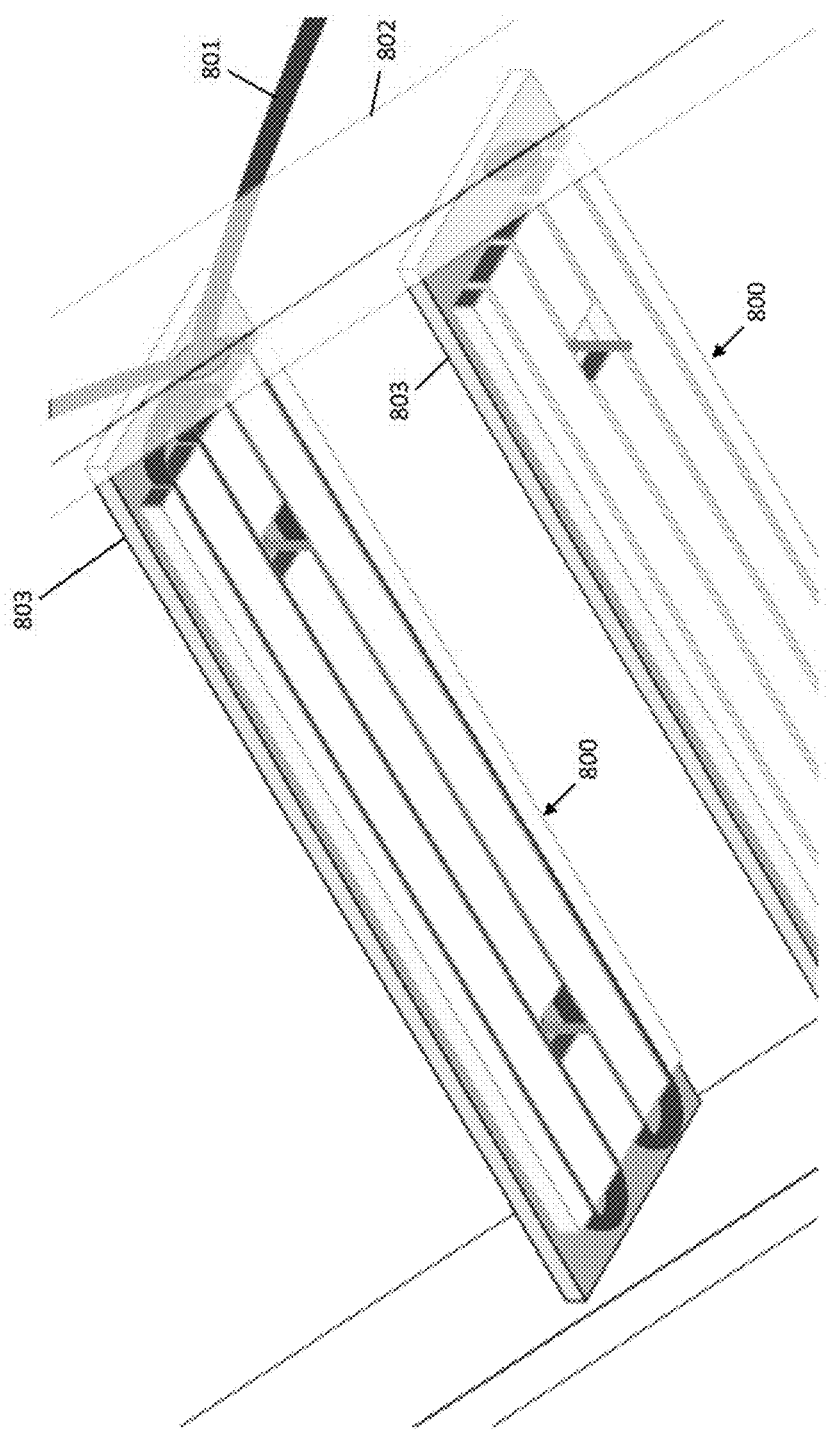
FIG. 8 illustrates another step in a method of installing the system on a stairway.
Figure 9:
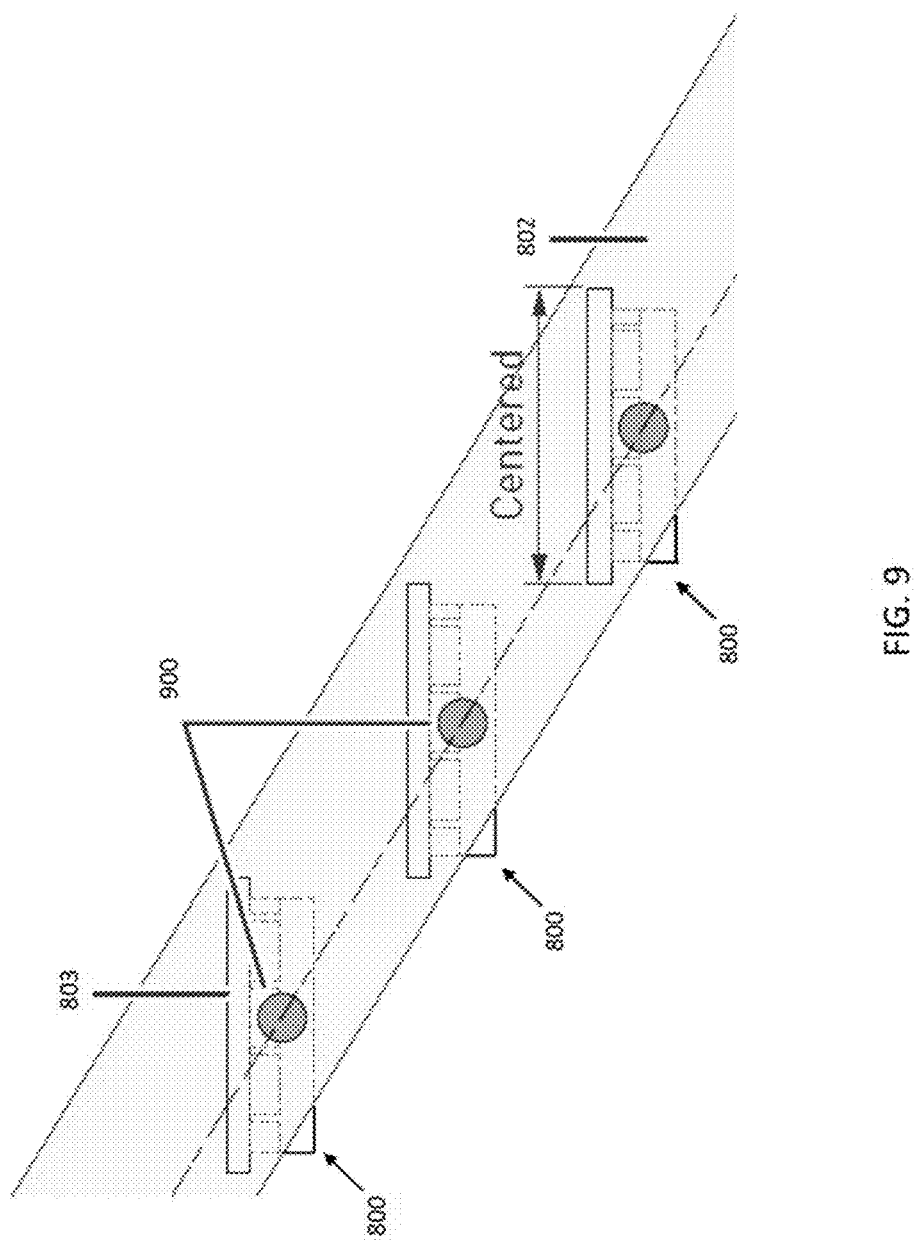
FIG. 9 illustrates the system installed on a stairway.
Figure 10:
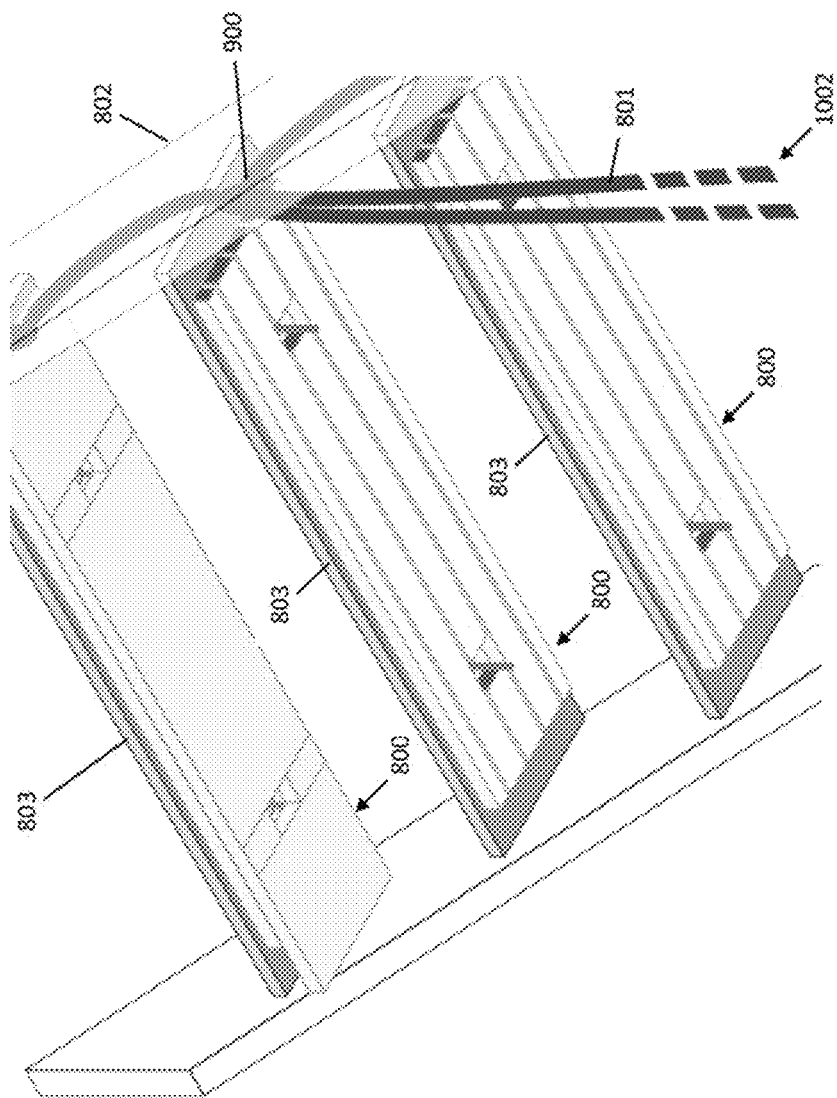
FIG. 10 illustrates the method of installing the system on a horizontal surface.
Figure 11:
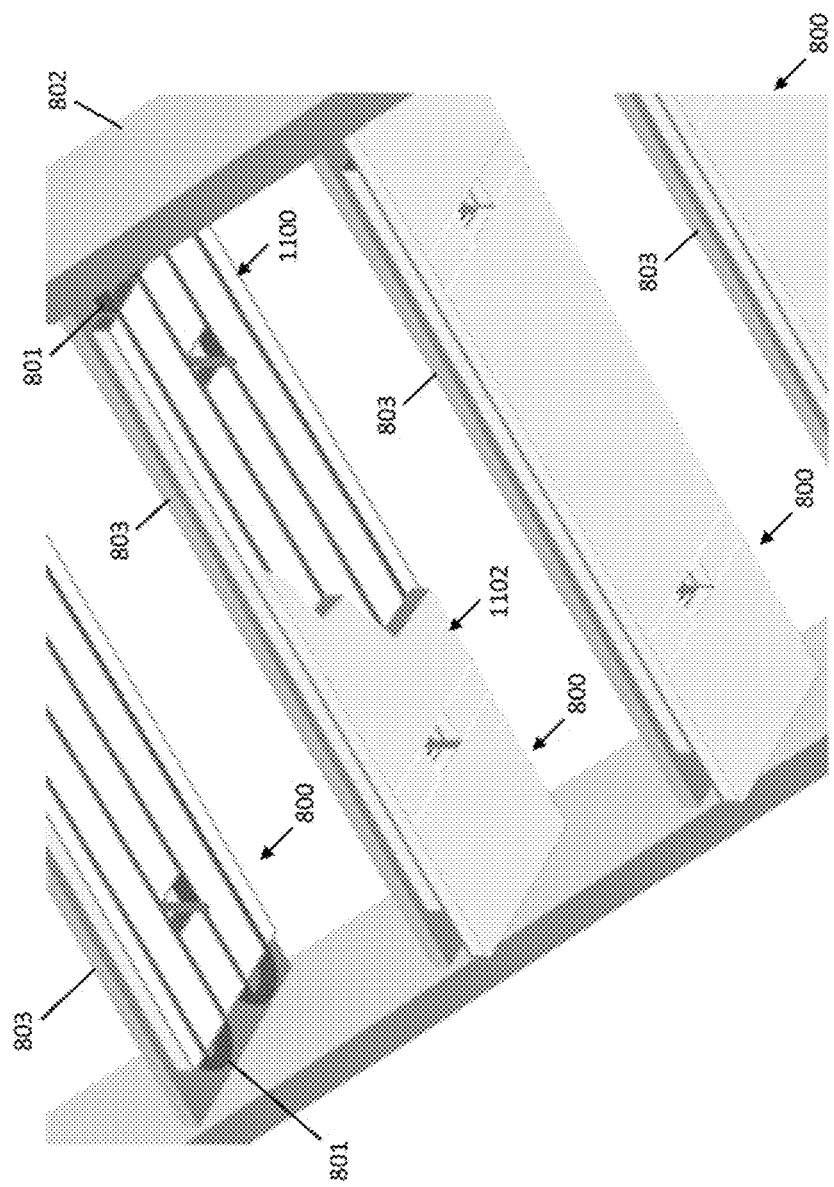
FIG. 11 depicts the system installed on a horizontal surface.

Referring to FIGS. 8 and 9, in addition to flat walkways, a SMH system comprising a series of SMH panels 800 may also be installed on multiple steps in a stairway. In this case, it may be necessary for the heating cable 801 to be mechanically protected going from one panel 800 (i.e., installed on a step 803) to the next. An example method of installation to achieve this is by passing the cable 801 through a stringer 802 between steps 803. Holes 900 in the stringer 802 may be utilized for cable entry and exit for each step 803 without interfering with the operation of the system if all sharp edges are deburred. It may be necessary in some embodiments for the holes 900 to be centered under the stair 803 treads as shown in FIG. 9. In an example process of installation, as shown in FIG. 10, the far end of the heating cable 801 is secured outside the stringer 802, and a heating cable loop 1002 of sufficient length is pulled under the first step 803 from the hole 900 in stringer 802. In an example embodiment, the length of a heating cable 801 typically required for a single SMH panel 800 is approximately four times the length of the panel 800 plus the width of the panel 800. Additional heating cable 801 may be required for routing between SMH panels 800 or to junction boxes (not shown), the length of which may be dependent on the relative mounting positions (e.g., distance between steps 803). As depicted in FIG. 11, the top layer 1100, heating cable 801, and bottom layer 1102 that comprise an SMH panel 800 may be installed on any number of steps 803 in a stairway in a similar fashion to the one described above for flat surfaces. In other embodiments, such as when holes are not present in the stringer 802, exposed cable going from one tread to other may be physically protected using conduit or similar means. The illustration in FIG. 12 depicts a series of SMH panels 1200 installed under a staircase 1201 without a stringer around the cable 1202.

Figure 13A:
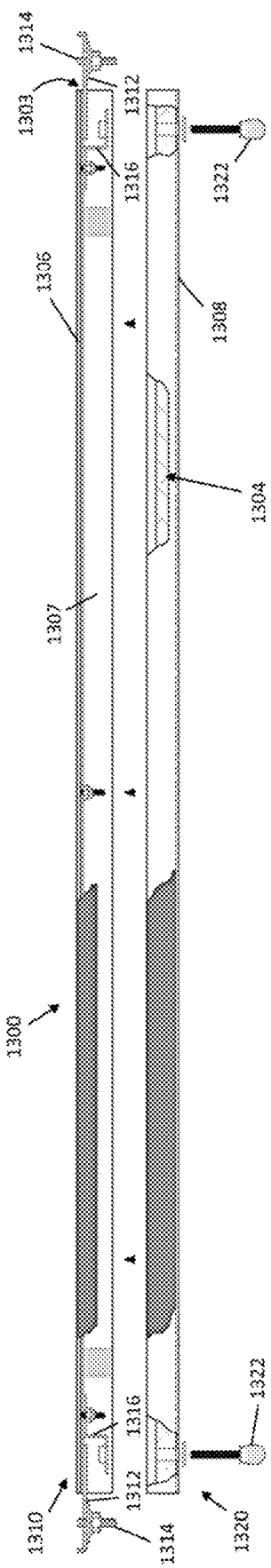
FIG. 13A is a partial cutaway side view of another embodiment of a suspension mounted heating system panel.
Figure 13B:
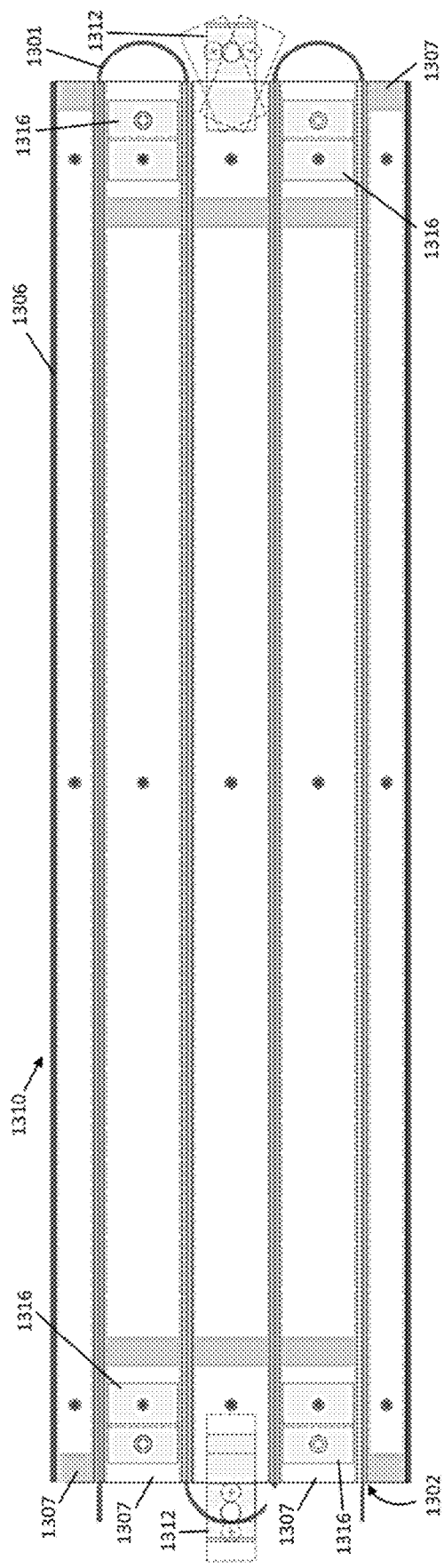
FIG. 13B is a bottom view of a top layer of the panel of FIG. 13A.

Referring to FIGS. 13A-B, an alternate embodiment of a SMH panel 1300 may employ a modified set of mechanisms, compared to the example embodiments described above, for attaching the top layer 1310 to the bottom layer 1320 and the panel 1300 to a stair or walkway. Generally, the cable support tray 1303 of the top layer 1310 is as described above, including a plurality of thermally conductive supportive structures 1307, such as extruded c-shaped channels, attached to a thermally conductive plate 1306, and spaced apart to form slots 1302 for retaining a heating cable 1301. The top layer 1310 may further include one or more mounting brackets 1312 that attach to (e.g., via fasteners) and extend outside of the perimeter of the support tray 1303. The mounting brackets 1312 can receive a fastener 1314 that attaches the top layer 1310 to the step or walkway as described above. In some embodiments, one or more of the mounting brackets 1312 can be movably attached to the plate 1306; for example, a mounting bracket 1312 can slide longitudinally (i.e., in the direction parallel to the slots 1302) a certain distance, and/or can rotate around a point within the perimeter of the plate 1306. This provides flexibility of mounting points, where the mounting bracket 1312 can be repositioned to align with a suitable attachment point on the step/walkway and the fastener 1314 disposed through both.

In some embodiments, the top layer 1310 may further include one or more interfacing brackets 1316 attached to the plate 1306. The interfacing brackets 1316 can receive fasteners 1322 that extend upward through the bottom layer 1320 in order to secure the bottom layer 1320 to the top layer. FIGS. 14 and 14A-B illustrate the attachment mechanisms of the SMH panel 1300 in operation to attach the SMH panel 1300 to a step 1400. To wit, fasteners 1314 cooperate with mounting brackets 1312 to secure the top layer 1310 to the underside of the step 1400, and then fasteners 1322 are disposed through the bottom tray 1308 and insulation layer 1304 and cooperate with interfacing brackets 1316 to secure the bottom layer 1320 to the top layer 1310.

Figure 15:
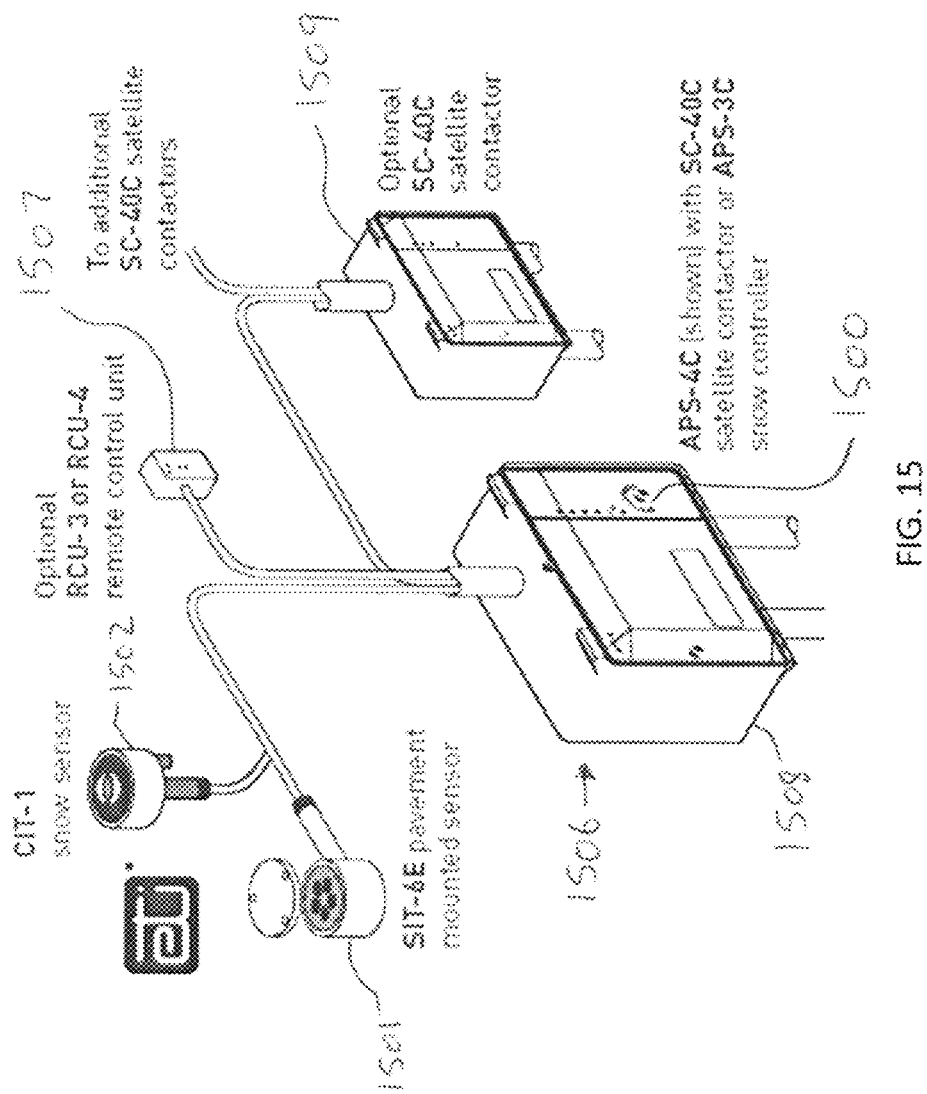
FIG. 15 is an example embodiment of a control system.

There are a number of control systems that may be used with the SMH system. FIG. 15 illustrates a number of these control systems, including a manual on/off control 1500, a slab sensing thermostat 1501, and an automatic snow controller 1502 that can be used in the system together or individually.

All three control methods may require contactors 1503 appropriately sized to carry the load. Each method may offer a trade-off balancing initial cost versus energy efficiency and ability to provide effective snow melting. For example, if the system is not energized when required, snow will accumulate. If the system is energized when it is not needed, there will be unnecessary power consumption. Typically a control method may be chosen that best meets the project performance requirements.

In some embodiments, a manually controlled system may be operated by a switch 1500 that controls the system power contactor. This method may require constant human supervision to work effectively. A manual system could also be controlled by a building management system. Embodiments that use a slab sensing thermostat 1501 can be used to energize the system whenever the slab temperature is below freezing. This may not be energy efficient when used as the sole means of control, and in some embodiments may be used in conjunction with other control methods. A slab sensing thermostat 1501 is effective for all surface snow melting and anti-icing applications, The electronic slab sensing thermostat 1501 can monitor the temperature of a surface and control whether the heating cables are turned on or off. A temperature threshold may be set, such that when the temperature of the slab drops below the set value the heating cables are turned on to heat the slab. In some embodiments, the temperature set point and LED indicators for alarm, power, and heating cable status can be visually checked on a the thermostat device 1506.

Some embodiments may use an automatic snow controller. The snow melting system may be automatically energized when both precipitation and low temperature are detected. When precipitation stops or the ambient temperature rises above freezing, the system is de-energized. The automatic snow controller may work cooperatively with a slab sensing thermostat 1501. For example, a slab sensor 1501 may de-energize the system after the slab reaches the slab sensing set point even if freezing precipitation is still present. Using an automatic snow controller with a slab sensor 1501 may offer a more energy-efficient control solution. For areas where a large number of circuits are required, the Surface Snow Melting control mode some embodiments may include an external device control option 1507. This option may allow a Snow/Moisture sensing controller to be integrated into the embodiment of the system.

In some embodiments, an automatic snow melting controller may be housed in an enclosure 1508 to provide effective, economical, automatic control of all snow melting applications. Some embodiments may be available in 120 V and 208-240 V, 50/60 Hz models. The automatic snow melting controller may include a 24-Amp DPDT output relay, adjustable hold-on timer, and integral high limit temperature sensor with an adjustable range of 40° F. to 90° F. (4° C. to 32° C.). For larger staircase or walkway applications, some embodiments may operate multiple satellite contactors 1509 capable of managing larger loads.

Other control method embodiments may include a number of sensors. For example, an overhead snow sensor 1502 that detects precipitation or blowing snow at ambient temperatures below a specified temperature may be used with an automatic snow melting controller in some embodiments. In other embodiments, the slab sensor 1501 may be a pavement-mounted sensor that signals for the heating cable to turn on when the pavement temperature falls below a specified temperature and precipitation in any form is present. In these embodiments, microcontroller technology may be used in the control devices to effectively eliminate ice bridging while ensuring accurate temperature measurement. Some embodiments may provide control and status displays to a controller 1507 from a remote location.

The SMH may connect to a power connection gland using a NEMA 4× rated gland kit with flexible conduit to protect and connect heating cable 1305 to a junction box. Heat shrink tube may be used to seal the end of the heating cable 1305.

In typical embodiments, the power output may be 20 W/ft. In general the SMH may be approximately 9" wide with a maximum length of about 56". The device will be sized to have a thickness that is small enough to not take up much space in a suspension mounted position. The materials are also light enough so as to be easily supported and installed.

Individual tray systems may be used, such as in the case of a stairway. In other embodiments, multiple SMH trays may be joined together to form larger SMH systems capable of melting ice in larger surface area applications.

In some cases, the electric heating cables may be connected in series, with different portions being positioned within different SMH systems. For example, when multiple SMH sections are used in a stairway, multiple heating cables may be connected together to form a single cable that can run from stair to stair. Once installed, the complete system provides efficient and uniform heat transfer across the heated surface.

Figure 16:
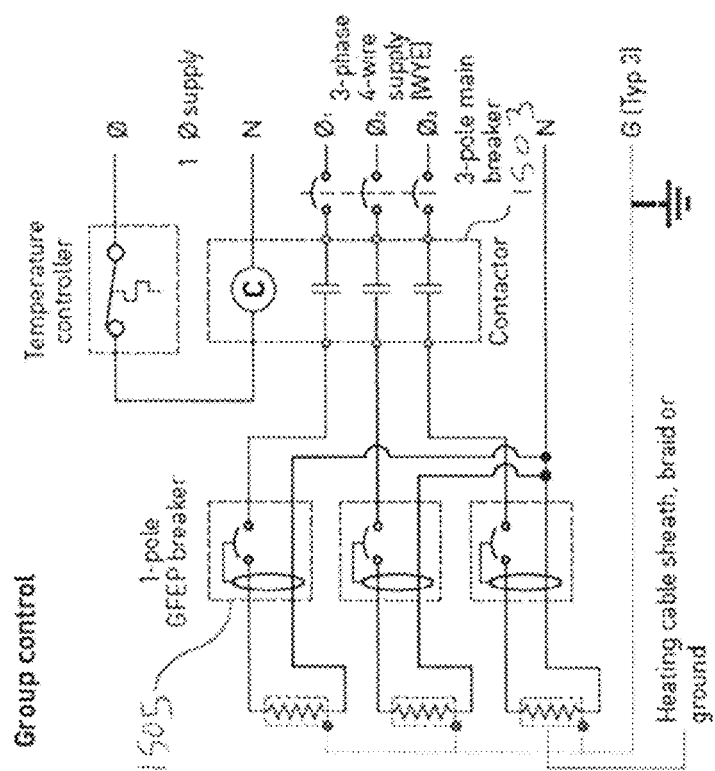
FIG. 16 is another example embodiment of a control system.
Figure 17:
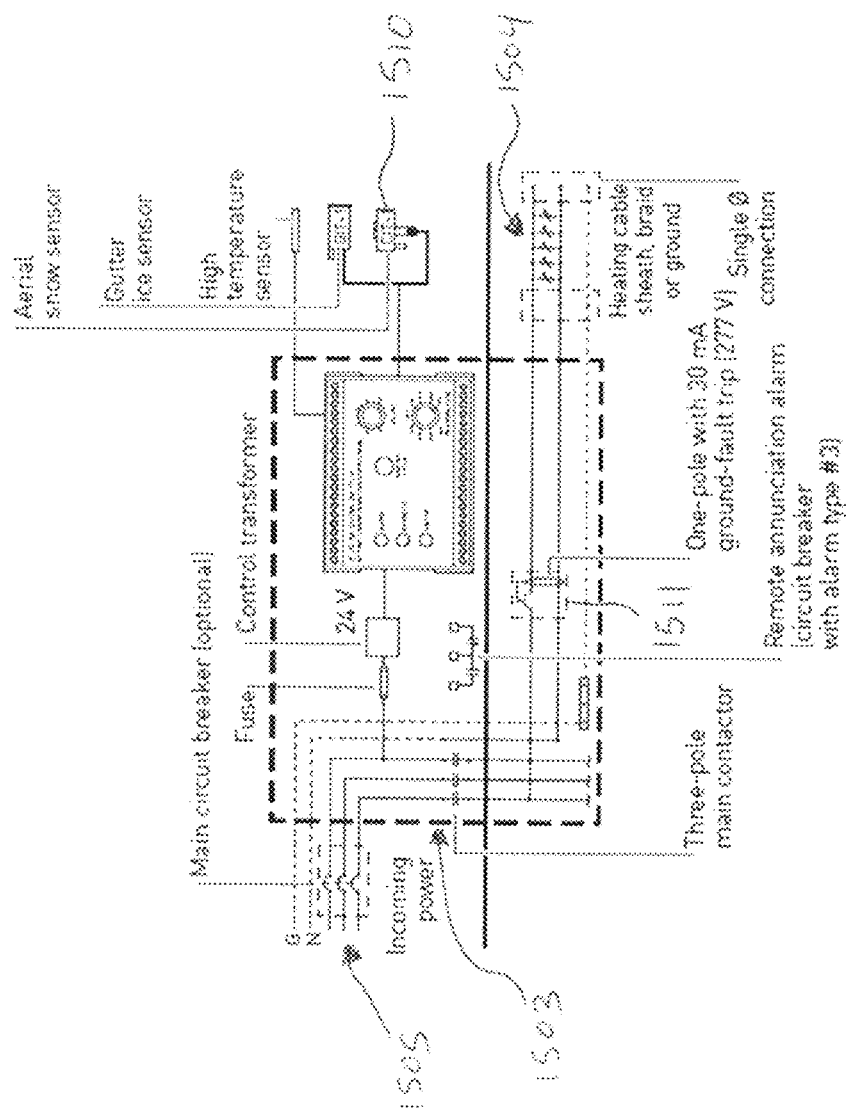
FIG. 17 is yet another example embodiment of a control system.

FIG. 16 shows typical wiring schematics for example embodiments of single and group control systems; FIG. 17 shows a typical wiring schematic for an example embodiment of large systems with many circuits. Generally, control systems embodiments may include single-phase power distribution panel that includes a primary circuit breaker 1505, switch-controlled power contactor 1503, ground-fault protection 1511, monitoring, and control for snow melting systems. Single-phase voltages may include 208 and 277 V.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A suspension mounted heating (SMH) system for heating one or more walking surfaces of a stairway or walkway, the SMH system comprising:

a plurality of SMH panels each able to be fastened to the stairway or walkway on an underside of one of the one or more walking surfaces, and each comprising:
  a thermally conductive plate having a top surface that abuts the underside of the walking surface when the SMH panel is fastened to the stairway or walkway;
  a plurality of thermally conductive supportive structures attached to the thermally conductive plate to form a cable support tray, the plurality of thermally conductive supportive structures spaced apart from each other to form a plurality of slots;
  an insulation layer; and
  a bottom support tray retaining the insulation layer and, when the SMH panel is fastened to the stairway or walkway, disposed below the cable support tray, covering the plurality of slots
  wherein the cable support tray, the bottom support tray, and the insulation layer each comprise a first aperture and a second aperture aligned with the first aperture;
a self-regulating heating cable electrically configured to be connected to a power supply and disposed within a first SMH panel and a second SMH panel of the plurality of SMH panels, the plurality of slots of the first SMH panel defining a path of the heating cable that positions the heating cable relative to at least one of the one or more walking surfaces in order to transfer heat from the heating cable to the underside of the at least one walking surface; and
a first fastener, a second fastener, a first locking device, a second locking device, a third locking device, and a fourth locking device, the first SMH panel being fastened to the stairway or walkway when:
the first fastener is attached to the stairway or walkway, extending downward from the underside of a first walking surface of the one or more walking surfaces and through the first apertures of the cable support tray, the bottom support tray, and the insulation layer;
the second fastener is attached to the stairway or walkway, extending downward from the underside of the first walking surface and through the second apertures of the cable support tray, the bottom support tray, and the insulation layer;
the first locking device is attached to the first fastener and the second locking device is attached to the second fastener to secure the cable support tray in place with the top surface of the thermally conductive plate abutting the underside of the first walking surface;
the heating cable is disposed in the plurality of slots of the first SMH panel; and
the third locking device is attached to the first fastener and the fourth locking device is attached to the second fastener to secure the bottom support tray in place against the cable support tray.

2. The SMH system of claim 1, wherein the plurality of slots of each of the plurality of SMH panels have a slot width selected to:
  allow the heating cable to be inserted by a system installer into a corresponding slot of the plurality of slots; and
  retain the heating cable within the corresponding slot.

3. The SMH system of claim 1, wherein the cable support tray and the bottom support tray of the first SMH panel have an equal width, and longitudinal edges of the cable support tray are aligned with longitudinal edges of the bottom support tray, providing a uniform assembly, when the first SMH panel is fastened to the stairway or walkway.

4. The SMH system of claim 1, further comprising a controller in electrical communication with one or both of the power supply and the heating cable, the controller comprising a processor and memory storing machine-readable program instructions that, when executed by the processor, cause the controller to receive control signals and energize and de-energize the heating cable in response to the control signals.

5. The SMH system of claim 4, further comprising one or more sensors in electronic communication with the controller and configured to detect the presence of snow or ice on the one or more walking surfaces and send one or more of the control signals to the controller.

6. A system configured to be suspended from a walkway, the system comprising:
a top layer comprising:
a top plate in contact with a surface on an underside of the walkway;
a cable support tray configured to receive a heating cable so that heat generated by the heating cable transfers through the top plate to the surface; and
a first mounting bracket and a second mounting bracket each attached to the top plate and extending beyond a perimeter of the top plate; and
a bottom layer aligning with the top layer and comprising a support tray and an insulation layer disposed within the support tray.

7. The system of claim 6, wherein the cable support tray comprises a plurality of supportive structures attached to the top plate and spaced apart from each other to form a plurality of slots for retaining the heating cable, the plurality of slots defining a path for positioning the heating cable relative to the surface.

8. The system of claim 7, wherein the plurality of supportive structures are thermally conductive.

9. The system of claim 7, wherein the plurality of supportive structures are rectangular tubes.

10. The system of claim 7, wherein the plurality of supportive structures are u-shaped channels.

11. The system of claim 7, wherein the insulation layer comprises a dosed cell foam insulation, the bottom layer abutting the top layer to cover the plurality of slots.

12. The system of claim 6, further comprising:
a plurality of fasteners attaching to the walkway and extending through the top plate and the support tray; and
a plurality of locking devices each attaching to a corresponding fastener of the plurality of fasteners to suspend the system from the walkway.

13. The system of claim 6, wherein the first and second mounting brackets each receive a corresponding fastener extending through the walkway to suspend the system from the walkway.

14. The system of claim 13, wherein the first mounting bracket is movably attached to the top plate such that the first mounting bracket can be repositioned to align with an attachment point on the walkway.

15. A method of installing a suspension mounted heating (SMH) system for melting snow and ice on a walking surface of a walkway or stairway, the method comprising:
installing a plurality of fasteners on the walkway or stairway such that each of the plurality of fasteners extends downward from a corresponding surface of one or more surfaces on an underside of the walkway or stairway;
installing a top layer of a first SMH panel to a first surface of the one or more surfaces so that the plurality of fasteners extend through corresponding apertures of the top layer, the top layer comprising a plurality of slots;
attaching a first set of locking devices to the plurality of fasteners to secure the top layer of the first SMH panel in place with the first surface;
positioning a heating cable within the top layer of the first SMH panel in a pattern defined by the plurality of slots so that heat generated by the heating cable transfers through the top layer and the first surface to the walking surface;
aligning a thermally insulating bottom layer of the first SMH panel with the top layer of the first SMH panel so that the plurality of fasteners extend through corresponding apertures of the bottom layer; and
attaching a second set of locking devices to the plurality of fasteners to secure the bottom layer of the first SMH panel to the top layer of the first SMH panel.

16. The method of claim 15, wherein installing the top layer of the first SMH panel comprises sliding the top layer over a first fastener and a second fastener of the plurality of fasteners, and attaching a first locking device of the first set of locking devices to the first fastener and a second locking device of the first set of locking devices to the second fastener to secure the top layer against the first surface.

17. The method of claim 15, further comprising:
installing a top layer of a second SMH panel to the first surface or a second surface of the one or more surfaces, the top layer comprising a plurality of slots;
positioning the heating cable within the top layer of the second SMH panel in the pattern defined by the plurality of slots of the top layer of the second SMH panel;
aligning a thermally insulating bottom layer of the second SMH panel with the top layer of the second SMH panel; and
fastening, with one or more of the plurality of fasteners, the bottom layer of the second SMH panel to the top layer of the second SMH panel.

* * * * *